Jan. 3, 1950   G. HERZOG   2,493,346

WELL LOGGING DETECTOR CALIBRATION

Filed Aug. 29, 1946

INVENTOR.
GERHARD HERZOG
BY Daniel Stryker

Patented Jan. 3, 1950

2,493,346

UNITED STATES PATENT OFFICE 2,493,346

WELL LOGGING DETECTOR CALIBRATION

Gerhard Herzog, Houston, Tex., assignor to The Texas Company, New York, N. Y., a corporation of Delaware Application August 29, 1946, Serial No. 693,775

10 Claims. (Cl. 250—83.6)

1

This invention relates to radioactivity well logging and more particularly to the continuous calibration of the radiation detector to eliminate errors due to the variations in the detector response caused by variations in temperature within the hole. The principal object of the invention is to provide a method and apparatus by means of which the effect of temperature variations on the detector can be readily measured simultaneously with the making of the log and without in any manner prolonging or slowing the logging operation.

In that type of well or bore hole logging in which a radiation detector or counter is passed through the hole to measure the natural gamma ray activity of the formations traversed by the hole, it is known that the working plateau of the counter varies somewhat with temperature, this necessitating frequent calibrations of the instruments. In accordance with this invention two radiation detectors are mounted in the probe or housing which is lowered and raised through the hole, and mounted in fixed relation to one of the detectors is a small source of radioactive material, such as radium. The detector closest to the radioactive source responds to the radiation from the source and any change in the operation of this detector during the passage through the hole will be due to temperature changes within the hole. This may be termed the "standardization" detector. The other detector is shielded from the radiation source and responds to the gamma rays emitted by the formations surrounding the hole. Thus by measuring the variations in the output of the standardization detector simultaneously with the logging of the radioactivity of the formations by the other or "main" detector, an accurate determination can be made as to the effect of the temperature variations within the hole and this temperature effect can then be eliminated or compensated for.

In one embodiment of the invention two separate detectors are disposed in the hole, each detector being connected to a preamplifier and then to a separate amplifier and recorder at the surface and in another embodiment a single detector or counter is used but is divided into two sections, one of which responds to the radiation from a source within the probe and the other to the radiation from the surrounding formations. In this embodiment it would be difficult, if not impossible, to shield the main detector section from the influence of a gamma ray source and it is therefore preferred that the source comprise a material capable of emitting alpha or beta particles rather than gamma rays since these particles will not travel far enough to reach the main detector section. Instead of making two separate records of the outputs of the two detectors the detectors can be connected to a potentiometer in such a manner that a single record of the ratio of the outputs of the two detectors can be made.

For a better understanding of the invention reference may be had to the accompanying drawing in which.

Figure 1:
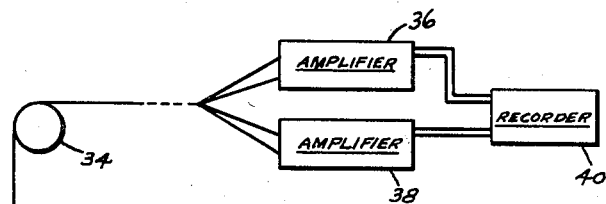
Figure 1 is a vertical, sectional elevation through a bore hole showing a logging probe in which two separate detectors are disposed.
Figure 1:
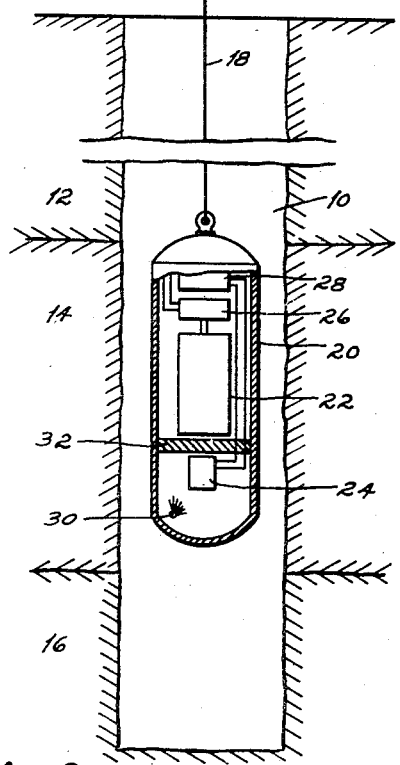

Referring to the drawing a bore hole 10 is shown as traversing several formations of strata such as 12, 14 and 16, the natural gamma radioactivity of which it is desired to ascertain. Suspended within the hole 10 by means of a cable 18 is a housing or probe 20 in which are mounted radiation detectors 22 and 24, preamplifiers 26 and 28, a source of gamma radiation 30 and a gamma ray shield 32 disposed between the two detectors. The cable 18 which is shown as of the multi-conductor type passes over a measuring drum 34 which measures the depth of the probe in the hole and is connected to a pair of amplifiers 36 and 38 at the surface, the outputs of which will lead to a recording device 40.

As the probe 20 is passed through the hole 10 the detector or counter 22 will respond to the gamma rays emitted from the surrounding formations and the output of this detector passes to the preamplifier 26, then through the cable 18 to one of the amplifiers 36 or 38 and then to the recorder 40 where a record of the response of the detector is made. As has been stated hereinbefore temperature changes within the bore hole frequently cause variations in the working plateau of the counter and consequently errors in the resulting log. In order to prevent these errors the gamma ray detector 24 which may be considerably smaller than the main detector 22 is mounted within the probe 20 in close proximity to the detector 22 and the gamma ray source 30 is disposed so that gamma rays therefrom will strike the detector 24. The output of detector 24 passes through the preamplifier 28 and the other one of the amplifiers 36 or 38 to the recorder 40 where it is recorded continuously as a separate record. The shield 32 which may be of lead or other suitable material prevents the direct gamma rays from the source 30 from striking the main detector 22. The small detector 24 will be activated by the source 30 to such an extent that changes in its response due to the radioactivity of the surrounding earth formations are extremely small as compared to the response due to the presence of the source 30. Any variations in the response of the detector 24 will therefore be indicative of the temperature effect and by comparing the two records of the outputs of the detectors 22 and 24 the main record or log produced by the detector 24 can be interpreted or corrected for the temperature variations occurring in the hole.

Although the detectors 22 and 24 may be of any suitable form such as ionization chambers or conventional Geiger-Mueller counters it is preferred that these detectors be of the high efficiency counter type such as is disclosed, for instance in the U. S. Letters Patent of D. G. C. Hare No. 2,391,071, granted March 19, 1946.

Figure 2:
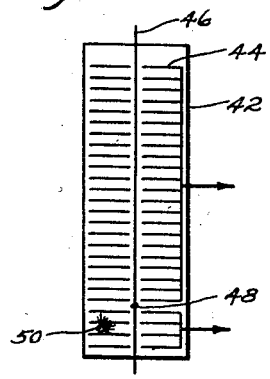
Figure 2 is a diagrammatic illustration of a single detector divided into two sections.

In another embodiment of the invention which is illustrated diagrammatically in Figure 2 a single counter may be used, this preferably being of the type disclosed in the aforementioned Hare patent and comprising an envelope or casing 42 containing a cathode and an anode in a gaseous atmosphere. The cathode is formed of a plurality of thin metallic plates or sheets 44 disposed in parallel, separated relation and provided with center holes through which an anode wire 46 is stretched. At a point near its lower end the anode wire 46 has affixed thereto a small bead 48 of glass or other insulating material, this serving to divide the counter into two sections as is explained more fully in the U. S. Letters Patent of H. G. Stever No. 2,351,845, granted June 20, 1944. The cathode plates above the bead 48 are connected together and to a preamplifier such as 26 in Figure 1 while the cathode plates below the bead are connected to the other preamplifier in the probe. The anode 46 is connected, of course, to the input of both preamplifiers. In this modification a source 50 of alpha or beta particles is mounted within the lower or smaller counter section and the counter formed by the cathode plates below the bead 48 and the lower portion of the anode wire will respond substantially entirely to the emanations from this source 50 whereby the output of this counter section will indicate the effect of temperature variations within the bore hole as has been explained in reference to Figure 1 as a source of alpha particles a small amount of polonium is suitable. The upper or larger counter section will respond to the gamma radiation from the surrounding formations. Since the alpha or beta particles from the source 50 can travel but a very small distance they will not reach the portion of the counter above the bead 48 and therefore no shielding is required between the counter sections.

Figure 3:
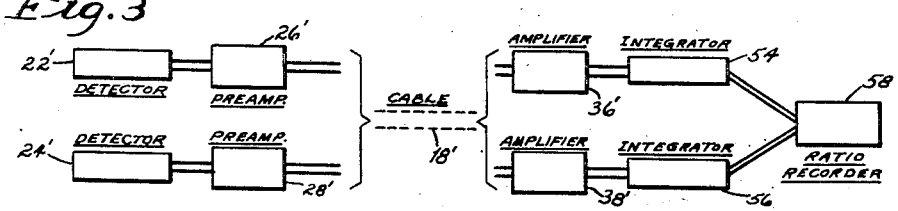
Figure 3 is a schematic diagram of two detectors connected so that the ratio of the outputs will be indicated.

Instead of recording separately the outputs of the two detectors of Figure 1 or the detector sections of Figure 2 the detectors may be connected as is shown in Figure 3 in such a manner that the ratio of the outputs will be indicated or recorded. In Figure 3 each of the detectors 22' and 24' is connected through its preamplifier 26' or 28', the cable 18' and its respective amplifier 36' or 38' to an integrator 54 or 56 and the two integrators are then connected to a device 58 for recording the ratio of the amplified and integrated outputs of the two detectors.

Figure 4:
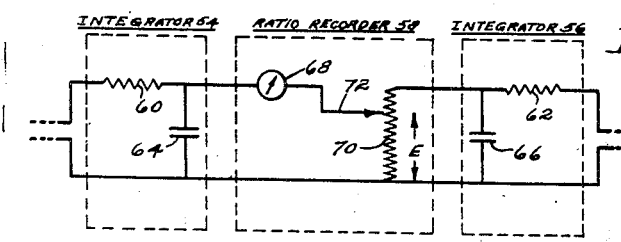
Figure 4 is an enlarged representation of the ratio recorder.

As is shown more clearly in Figure 4 each integrating circuit comprises essentially a resistance 60 or 62 and a condenser 64 or 66. The output of the integrator 54 is connected to the galvanometer 68 and one end of the resistance 70 of an automatic potentiometer or ratio recorder 58 shown as of the Leeds-Northrup type which automatically sets the position of the arm 72 so that the voltage E, which is part of the voltage across condenser 66 is equal to the voltage across the other integrator condenser 64. The position of the arm 72 is recorded and gives the ratio of the voltages across condenser 64 and 66 and thus the ratio of the outputs or responses of the two detectors 22' and 24'. Any variations in the outputs of the two detectors due to temperature changes are therefore compensated for.

In order to simplify the description no reference has been made to the high voltage which will, of course, be impressed across the cathodes and anodes of the detectors as is well known to those familiar with this art.

Obviously many modifications and variations of the invention, as hereinbefore set forth, may be made without departing from the spirit and scope thereof and, therefore, only such limitations should be imposed as are indicated in the appended claims.

I claim:

1. The method of logging a bore hole which comprises passing through said hole means for detecting variations in the natural gamma radioactivity of the formations surrounding said hole, continuously measuring in the close vicinity of said detecting means direct radiation from a radioactive source passed through the hole with said detecting means, and noting variations in the measurements of the radioactivity from said source caused by changes in a characteristic of said hole.

2. The method of logging a bore hole which comprises passing through said hole a detector of gamma radiation for detecting variations in the natural radioactivity of the formations surrounding said detector, continuously measuring direct radiation from a radioactive source maintained in fixed space relation with respect to said detecting means, and noting variations in the measurements of the radioactivity from said source caused by temperature changes in the hole.

3. The method of logging a bore hole which comprises measuring continuously throughout at least a portion of the length of said hole variations in the natural gamma radioactivity of the formations surrounding said portion of the hole, continuously measuring at a fixed distance from the location of the first named measurements direct radiation from a radioactive source in the hole and maintained a fixed distance from the location of the first named measurements, and noting variations in the measurements of the radioactivity from said source caused by temperature changes in the hole.

4. The method of logging a bore hole which comprises passing through said hole a detector of gamma radiation for detecting variations in the natural gamma radioactivity of the formations surrounding said detector, detecting by a second detector in the close vicinity of said first detector direct radiation from a radioactive source passed through the hole with said detectors, the response of said second detector to radiation from said source varying with temperature changes in the hole, and measuring the ratio of the detected radiation from the formations and from said source.

5. A bore hole logging device comprising a gamma ray detector, means for passing said detector through the bore hole, means for measuring the response of said detector to gamma rays emitted from the formations traversed by the bore hole, a second radiation detector disposed in fixed relation to the first detector, a source of radiation mounted in close proximity to the second detector, and means for measuring the response of said second detector to direct radiation emitted by said source, the response of said second detector varying in accordance with variations of temperature in said bore hole.

6. A bore hole logging device comprising a gamma ray detector, means for passing said detector through the bore hole, means for measuring the response of said detector to gamma rays emitted from the formations traversed by the bore role, means for continuously calibrating said detector as its response varies with temperature changes in the hole comprising a second radiation detector disposed in close proximity to the first detector, a gamma ray source mounted in fixed relation to said second detector, and means for measuring variations in the response of the second detector to radiation from the source, said variations being caused by temperature changes in said hole.

7. A bore hole logging device comprising a gamma ray detector, means for passing said detector through the bore hole, means for measuring the response of said detector to gamma rays emitted from the formations traversed by the bore hole, a second gamma ray detector disposed in fixed relation to the first mentioned detector, a source of gamma rays mounted in close proximity to the second detector, means for shielding the first detector from said source, and means for measuring the response of said second detector to gamma rays emitted by said source, the response of said second detector varying in accordance with variations of temperature in said bore hole.

8. A bore hole logging device comprising a gamma ray detector, means for lowering and raising said detector through the bore hole, means for measuring the response of said detector to gamma rays emitted from the formations traversed by the bore hole, means for continuously calibrating said detector as its response varies with temperature changes in the hole comprising a second gamma ray detector disposed in close proximity to the first detector, a gamma ray source mounted in fixed relation to said second detector, a gamma ray shield between said source and the first detector, and means for measuring variations in the response of the second detector to gamma rays from the source, said variations being caused by temperature changes in said hole.

9. A bore hole logging device comprising a gamma ray detector, means for passing said detector through the bore hole, means for measuring the response of said detector to gamma rays emitted from the formations traversed by the bore hole, means for continuously calibrating said detector as its response varies with temperature changes in the hole comprising a second radiation detector disposed in close proximity to the first detector, a radiation source mounted in fixed relation to said second detector, and means for measuring variations in the response of the second detector to gamma rays from the source, said variations being caused by temperature changes in said hole, and means for recording the ratio of the outputs of the two detectors.

10. A bore hole logging device comprising a gamma ray detector having a cathode and an anode in a gas atmosphere, said anode comprising a wire member disposed longitudinally with respect to the cathode, said detector being separated into two sections by a small mass of insulating material extending around and in contact with said anode wire at a point intermediate its ends, means for passing said detector through the bore hole, means for measuring the response of one section of said detector to gamma rays from the formations surrounding the bore hole, a radiation source disposed in fixed close relation to the other section of said detector, and means for measuring the response of said other detector section to radiation emitted by said source, the response of said other section varying with changes in temperature in the bore hole.

GERHARD HERZOG.

REFERENCES CITED

The following references are of record in the file of this patent:

UNITED STATES PATENTS

| Number | Name | Date |
| --- | --- | --- |
| 2,296,176 | Neufeld | Sept. 15, 1942 |